(12) United States Patent
Lynch

(10) Patent No.: US 10,666,084 B2
(45) Date of Patent: May 26, 2020

(54) DETECTION AND NOTIFICATION OF AN UNPOWERED RELEASABLE CHARGING DEVICE

(71) Applicant: Apple Inc., Cupertino, CA (US)

(72) Inventor: Kevin M. Lynch, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 300 days.

(21) Appl. No.: 15/179,922

(22) Filed: Jun. 10, 2016

(65) Prior Publication Data

US 2017/0012463 A1    Jan. 12, 2017

Related U.S. Application Data

(60) Provisional application No. 62/190,930, filed on Jul. 10, 2015.

(51) Int. Cl.
| | |
|---|---|
| *H02J 7/00* | (2006.01) |
| *H02J 7/02* | (2016.01) |
| *H02J 50/10* | (2016.01) |
| *H02J 50/80* | (2016.01) |

(52) U.S. Cl.
CPC .......... *H02J 7/027* (2013.01); *H02J 7/0047* (2013.01); *H02J 7/025* (2013.01); *H02J 50/10* (2016.02); *H02J 50/80* (2016.02)

(58) Field of Classification Search
USPC ........ 320/108, 109, 112, 113, 114, 115, 107, 320/137, 106, 134
See application file for complete search history.

(56) References Cited

U.S. PATENT DOCUMENTS

| | | | |
|---|---|---|---|
| 4,268,899 | A | 5/1981 | Rokas |
| 5,293,308 | A | 3/1994 | Boys et al. |
| 5,479,486 | A | 12/1995 | Saji |
| 5,639,989 | A | 6/1997 | Higgins, III |
| 6,198,260 | B1 | 3/2001 | Wittenbreder |
| 6,960,968 | B2 | 11/2005 | Odenaal et al. |
| 6,972,543 | B1 | 12/2005 | Wells |
| 7,339,558 | B2 | 3/2008 | Chen et al. |

(Continued)

FOREIGN PATENT DOCUMENTS

| | | |
|---|---|---|
| CN | 1826715 | 8/2006 |
| CN | 101243374 | 8/2006 |

(Continued)

OTHER PUBLICATIONS

U.S. Appl. No. 16/025,828, filed Jul. 2, 2018, Heresztyn et al.

(Continued)

*Primary Examiner* — Alexis B Pacheco
(74) *Attorney, Agent, or Firm* — Brownstein Hyatt Farber Schreck, LLP

(57) ABSTRACT

An electronic device may be configured to detect an external charging device when the external charging device is initially engaged with, or connected to, the electronic device. The electronic device, or an alert unit operably connected to the electronic device, can produce one or more alerts for the user if the charging device is in an unpowered state. The alert or alerts can be provided to the electronic device engaged with the charging device and/or to another electronic device or alert unit that is in communication with the electronic device that is engaged with the charging device.

20 Claims, 12 Drawing Sheets

(56) References Cited

U.S. PATENT DOCUMENTS

| | | | |
|---|---|---|---|
| 7,641,358 B1 | 1/2010 | Smith et al. | |
| 7,893,564 B2 | 2/2011 | Bennett | |
| 7,948,208 B2 | 5/2011 | Partovi et al. | |
| 7,952,322 B2 | 5/2011 | Partovi et al. | |
| 8,024,491 B1 | 9/2011 | Wright et al. | |
| 8,054,651 B2 | 11/2011 | Pollard | |
| 8,134,416 B2 | 3/2012 | Moiraghi et al. | |
| 8,169,151 B2 | 5/2012 | Kimura | |
| 8,169,185 B2 | 5/2012 | Partovi et al. | |
| 8,274,178 B2 | 9/2012 | Tucker | |
| 8,278,784 B2 | 10/2012 | Cook | |
| 8,329,376 B2 | 11/2012 | Kitamura et al. | |
| 8,332,547 B2 | 12/2012 | Sugaya | |
| 8,362,744 B2 | 1/2013 | Terao et al. | |
| 8,421,274 B2 | 4/2013 | Sun et al. | |
| 8,482,250 B2 | 7/2013 | Soar | |
| 8,629,652 B2 | 1/2014 | Partovi et al. | |
| 8,629,654 B2 | 1/2014 | Partovi et al. | |
| 8,663,106 B2 | 3/2014 | Stivoric | |
| 8,716,974 B2 | 5/2014 | Sakoda et al. | |
| 8,742,625 B2 | 6/2014 | Baarman et al. | |
| 8,810,071 B2 | 8/2014 | Sauerlaender et al. | |
| 8,853,892 B2 | 10/2014 | Fells et al. | |
| 8,884,469 B2 | 11/2014 | Lemmens | |
| 8,890,470 B2 | 11/2014 | Partovi et al. | |
| 8,896,264 B2 | 11/2014 | Partovi | |
| 8,901,881 B2 | 12/2014 | Partovi et al. | |
| 8,922,525 B2 | 12/2014 | Chen et al. | |
| 8,947,047 B2 | 2/2015 | Partovi et al. | |
| 9,018,904 B2 | 4/2015 | Seyerle et al. | |
| 9,030,421 B2 | 5/2015 | Tseng et al. | |
| 9,048,682 B2 | 6/2015 | Lee et al. | |
| 9,057,753 B2 | 6/2015 | Nakano et al. | |
| 9,093,857 B2 | 7/2015 | Sakai et al. | |
| 9,099,885 B2 | 8/2015 | Kamata | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,124,112 B2 | 9/2015 | Havass et al. | |
| 9,126,490 B2 | 9/2015 | Cook | |
| 9,148,201 B2 | 9/2015 | Kallal et al. | |
| 9,154,189 B2 | 10/2015 | Von Novak et al. | |
| 9,160,180 B2 | 10/2015 | Suzuki et al. | |
| 9,178,369 B2 | 11/2015 | Partovi | |
| 9,197,065 B2 | 11/2015 | Divan et al. | |
| 9,197,070 B2 | 11/2015 | Jung | |
| 9,197,082 B1* | 11/2015 | Zhang | G16H 40/63 |
| 9,231,411 B2 | 1/2016 | Baarman et al. | |
| 9,270,138 B2 | 2/2016 | Yamakawa et al. | |
| 9,276,437 B2 | 3/2016 | Partovi et al. | |
| 9,318,915 B2 | 4/2016 | Miller et al. | |
| 9,352,661 B2 | 5/2016 | Keeling et al. | |
| 9,356,659 B2 | 5/2016 | Partovi | |
| 9,407,107 B2 | 8/2016 | Park et al. | |
| 9,444,266 B2 | 9/2016 | Van Wageningen et al. | |
| 9,460,846 B2 | 10/2016 | Graham et al. | |
| 9,461,502 B2 | 10/2016 | Lee | |
| 9,496,731 B2 | 11/2016 | Park et al. | |
| 9,507,447 B2 | 11/2016 | Yilmaz | |
| 9,515,514 B2 | 12/2016 | Lee et al. | |
| 9,531,300 B2 | 12/2016 | Harrison et al. | |
| 9,537,363 B2 | 1/2017 | Bossetti et al. | |
| 9,685,802 B1* | 6/2017 | Mirov | H02J 7/0044 |
| 9,716,433 B2 | 7/2017 | Coleman et al. | |
| 9,754,717 B2 | 9/2017 | Long et al. | |
| 9,793,761 B2 | 10/2017 | Sampei et al. | |
| 9,800,076 B2 | 10/2017 | Jadidian et al. | |
| 9,811,204 B2 | 11/2017 | Sauer et al. | |
| 9,813,041 B1 | 11/2017 | Ritter | |
| 9,831,787 B1 | 11/2017 | Halberstadt | |
| 10,027,130 B2 | 7/2018 | Cho et al. | |
| 10,027,185 B2 | 7/2018 | Moyer | |
| 10,032,557 B1 | 7/2018 | Bossetti | |
| 10,116,169 B2 | 10/2018 | Cho et al. | |
| 2001/0044588 A1 | 11/2001 | Mault | |
| 2008/0174268 A1* | 7/2008 | Koo | A47L 9/2805 320/109 |
| 2008/0284609 A1 | 11/2008 | Rofougaran | |
| 2009/0146608 A1* | 6/2009 | Lee | H02J 7/025 320/108 |
| 2010/0201315 A1* | 8/2010 | Oshimi | H01M 10/46 320/108 |
| 2010/0295378 A1* | 11/2010 | Suzuki | H02J 7/025 307/104 |
| 2010/0328044 A1 | 12/2010 | Waffenschmidt et al. | |
| 2011/0050164 A1 | 3/2011 | Partovi et al. | |
| 2011/0109264 A1 | 5/2011 | Choi | |
| 2011/0136550 A1 | 6/2011 | Maugars | |
| 2011/0198937 A1 | 8/2011 | Tseng | |
| 2011/0221385 A1 | 9/2011 | Partovi et al. | |
| 2011/0221387 A1* | 9/2011 | Steigerwald | B60L 11/182 320/108 |
| 2011/0234012 A1 | 9/2011 | Yi et al. | |
| 2011/0241615 A1 | 10/2011 | Yeh | |
| 2011/0254379 A1 | 10/2011 | Madawala | |
| 2011/0298419 A1* | 12/2011 | Tsai | H01M 10/46 320/108 |
| 2011/0302078 A1 | 12/2011 | Failing | |
| 2012/0043932 A1* | 2/2012 | Nakama | H02J 7/0004 320/108 |
| 2012/0068550 A1 | 3/2012 | De Boer et al. | |
| 2012/0169139 A1 | 7/2012 | Kudo | |
| 2012/0206088 A1* | 8/2012 | Park | H02J 7/00 320/106 |
| 2012/0255039 A1 | 10/2012 | Sipes | |
| 2012/0313577 A1 | 12/2012 | Moes et al. | |
| 2013/0076648 A1 | 3/2013 | Krah et al. | |
| 2013/0093388 A1 | 4/2013 | Partovi | |
| 2013/0101127 A1 | 4/2013 | Buchmann | |
| 2013/0214909 A1 | 8/2013 | Meijers et al. | |
| 2013/0099563 A1 | 9/2013 | Partovi et al. | |
| 2013/0257168 A1 | 10/2013 | Singh et al. | |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2013/0334326 A1 | 12/2013 | Shan | |
| 2014/0015327 A1 | 1/2014 | Keeling et al. | |
| 2014/0015522 A1 | 1/2014 | Widmer et al. | |
| 2014/0035378 A1 | 2/2014 | Kesler et al. | |
| 2014/0103873 A1 | 4/2014 | Partovi et al. | |
| 2014/0125276 A1* | 5/2014 | Lampinen | H02J 5/005 320/108 |
| 2014/0129010 A1 | 5/2014 | Garg | |
| 2014/0132210 A1 | 5/2014 | Partovi | |
| 2014/0159501 A1 | 6/2014 | Kanno et al. | |
| 2014/0159656 A1 | 6/2014 | Riehl | |
| 2014/0191568 A1 | 7/2014 | Partovi | |
| 2014/0191818 A1 | 7/2014 | Waffenschmidt et al. | |
| 2014/0197687 A1 | 7/2014 | Lin | |
| 2014/0197782 A1 | 7/2014 | Graf et al. | |
| 2014/0225439 A1 | 8/2014 | Mao | |
| 2014/0247010 A1* | 9/2014 | Nishiwaki | H02J 17/00 320/108 |
| 2014/0266018 A1 | 9/2014 | Carobolante | |
| 2014/0306654 A1 | 10/2014 | Partovi | |
| 2014/0347007 A1 | 11/2014 | Kee et al. | |
| 2015/0001950 A1 | 1/2015 | Chung et al. | |
| 2015/0022194 A1* | 1/2015 | Almalki | G01R 33/02 324/244 |
| 2015/0035372 A1 | 2/2015 | Aioanei | |
| 2015/0077045 A1 | 3/2015 | Harris | |
| 2015/0280455 A1 | 3/2015 | Bosshard et al. | |
| 2015/0130412 A1 | 5/2015 | Partovi | |
| 2015/0207333 A1 | 7/2015 | Baarman et al. | |
| 2015/0214750 A1* | 7/2015 | Moshkovich | H02J 5/005 307/104 |
| 2015/0215006 A1 | 7/2015 | Mehas et al. | |
| 2015/0244179 A1 | 8/2015 | Ritter et al. | |
| 2015/0244341 A1 | 8/2015 | Ritter et al. | |
| 2015/0270058 A1 | 9/2015 | Golko et al. | |

(56) References Cited

U.S. PATENT DOCUMENTS

| | | |
|---|---|---|
| 2015/0333530 A1 | 11/2015 | Moyer et al. |
| 2015/0349538 A1 | 12/2015 | Agostinelli et al. |
| 2015/0364931 A1 | 12/2015 | Ren et al. |
| 2016/0043567 A1 | 2/2016 | Matumoto et al. |
| 2016/0049796 A1 | 2/2016 | Cho et al. |
| 2016/0056664 A1 | 2/2016 | Partovi |
| 2016/0064948 A1 | 3/2016 | Heresztyn et al. |
| 2016/0064992 A1 | 3/2016 | Herbst et al. |
| 2016/0072306 A1* | 3/2016 | Tsuda .............. H02J 5/005 |
| | | 307/104 |
| 2016/0127672 A1 | 5/2016 | Kamide et al. |
| 2016/0172894 A1 | 6/2016 | Khripkov et al. |
| 2016/0181849 A1 | 6/2016 | Govindaraj |
| 2016/0246326 A1* | 8/2016 | von Badinski ........ G01P 15/00 |
| 2016/0261137 A1 | 9/2016 | Riehl |
| 2016/0285278 A1 | 9/2016 | Mehas et al. |
| 2017/0012463 A1 | 1/2017 | Lynch |
| 2017/0089959 A1 | 3/2017 | Ito et al. |
| 2017/0110911 A1 | 4/2017 | Bossetti et al. |
| 2017/0222493 A1 | 8/2017 | Oki et al. |
| 2018/0013312 A1 | 1/2018 | Moyer et al. |
| 2018/0062443 A1 | 3/2018 | Cho et al. |
| 2018/0233955 A1 | 8/2018 | Park et al. |
| 2018/0294682 A1 | 10/2018 | Qiu et al. |
| 2018/0294742 A1 | 10/2018 | Qiu et al. |
| 2019/0006892 A1 | 1/2019 | Heresztyn et al. |
| 2019/0020213 A1 | 1/2019 | Moyer et al. |
| 2019/0157898 A1 | 5/2019 | Herbst et al. |

FOREIGN PATENT DOCUMENTS

| | | |
|---|---|---|
| CN | 101232190 | 7/2008 |
| CN | 101777801 | 7/2010 |
| CN | 101814757 | 8/2010 |
| CN | 102055250 | 5/2011 |
| CN | 102113195 | 6/2011 |
| CN | 102124624 | 7/2011 |
| CN | 102257696 | 11/2011 |
| CN | 102355035 | 2/2012 |
| CN | 102396132 | 3/2012 |
| CN | 202712982 | 1/2013 |
| CN | 102998711 | 3/2013 |
| CN | 103019485 | 4/2013 |
| CN | 202976038 | 6/2013 |
| CN | 103248132 | 8/2013 |
| CN | 103269092 | 8/2013 |
| CN | 103324333 | 9/2013 |
| CN | 103326475 | 9/2013 |
| CN | 103457362 | 12/2013 |
| CN | 103518175 | 1/2014 |
| CN | 103545893 | 1/2014 |
| CN | 103597711 | 2/2014 |
| CN | 103765722 | 4/2014 |
| CN | 103812162 | 5/2014 |
| CN | 103999320 | 8/2014 |
| CN | 104037750 | 9/2014 |
| EP | 1633122 | 8/2005 |
| EP | 2642628 | 9/2013 |
| GB | 2484999 | 5/2012 |
| JP | H06311658 | 4/1994 |
| JP | H06268565 | 9/1994 |
| JP | H08149608 | 6/1996 |
| JP | H08331850 | 12/1996 |
| JP | H10173741 | 6/1998 |
| JP | 2001069388 | 3/2001 |
| JP | 2001333551 | 11/2001 |
| JP | 2010161882 | 7/2010 |
| JP | 2010268531 | 11/2010 |
| JP | 2011120443 | 6/2011 |
| JP | 2011259612 | 12/2011 |
| JP | 2012503959 | 2/2012 |
| JP | 2013115929 | 6/2013 |
| JP | 2013183497 | 9/2013 |
| JP | 2013536664 | 9/2013 |
| JP | 2014023281 | 3/2014 |
| JP | 2014193087 | 10/2014 |
| KR | 1020070023337 | 2/2007 |
| KR | 1020120097155 | 9/2012 |
| KR | 20130055199 | 5/2013 |
| KR | 20140061337 | 5/2014 |
| WO | WO 09/045847 | 4/2009 |
| WO | WO 10/077991 | 7/2010 |
| WO | WO 10/108191 | 9/2010 |
| WO | WO 11/156555 | 12/2011 |
| WO | WO 12/085119 | 6/2012 |
| WO | WO 13/011905 | 1/2013 |
| WO | WO 13/122625 | 8/2013 |
| WO | WO 14/034966 | 3/2014 |
| WO | WO 2015102113 A1 * | 7/2015 ............. H02J 17/00 |
| WO | WO-2015102113 A1 * | 7/2015 ............. H02J 5/005 |
| WO | WO 16/024869 | 2/2016 |

OTHER PUBLICATIONS

U.S. Appl. No. 15/393,435, filed Dec. 29, 2016, Bossetti et al.
U.S. Appl. No. 15/467,998, filed Mar. 23, 2017, Bentov et al.
U.S. Appl. No. 15/468,001, filed Mar. 23, 2017, Qiu et al.
U.S. Appl. No. 14/290,411, filed May 29, 2014, Bossetti.
U.S. Appl. No. 14/295,249, filed Jun. 3, 2014, Bossetti et al.
U.S. Appl. No. 14/304,064, filed Jun. 13, 2014, Moyer et al.
U.S. Appl. No. 14/449,075, filed Jul. 31, 2014, Ritter.
U.S. Appl. No. 14/627,957, filed Feb. 20, 2015, Ritter et al.
U.S. Appl. No. 14/628,897, filed Feb. 23, 2015, Ritter et al.
U.S. Appl. No. 14/795,723, filed Jul. 9, 2015, Herbst et al.
U.S. Appl. No. 14/837,965, filed Aug. 27, 2015, Heresztyn et al.
U.S. Appl. No. 15/626,930, filed Jun. 19, 2017, Moyer et al.
U.S. Appl. No. 15/829,610, filed Dec. 1, 2017, Qiu et al.
U.S. Appl. No. 15/829,850, filed Dec. 1, 2017, Qiu et al.

* cited by examiner

DETECTION AND NOTIFICATION OF AN UNPOWERED RELEASABLE CHARGING DEVICE

CROSS-REFERENCE TO RELATED APPLICATION(S)

This application claims the benefit under 35 U.S.C. § 119(e) of U.S. Provisional Patent Application No. 62/190,930, filed Jul. 10, 2015, entitled "Detection and Notification of an Unpowered Releasable Charging Device," the entirety of which is incorporated herein by reference as if fully disclosed herein.

FIELD

This invention relates generally to electronic devices, and more particularly to the detection and notification of an unpowered power or charging device, such as, for example, a power cable or a wireless energy transfer device.

BACKGROUND

Portable electronic devices typically have a battery that needs to be recharged periodically. Power can be provided to the electronic device to recharge the battery using one of a variety of techniques. For example, a charging device either can plug into the electronic device to supply power, or the charging device can transfer power wirelessly to the electronic device. Both the wired and wireless charging devices include a power cable that plugs into a power supply, such as a wall outlet or another electronic device.

A user expects the electronic device to begin recharging immediately after he or she engages the electronic device with a charging device. However, in some situations, the charging device may be unpowered (e.g., not plugged in) when the user initially engages the electronic device with the charging device. The user may not realize the charging device is not able to supply power when he or she first engages the electronic device with the charging device, and, the user expects the electronic device to be recharged (either partially or fully) when the user returns after a period of time. Instead, the user discovers the electronic device is not recharged because the charging device itself is unpowered.

SUMMARY

Embodiments described herein provide techniques for detecting an unpowered charging device at the time the electronic device is initially engaged with the charging device. One or more notifications may be provided to the user via the electronic device and/or via another electronic device regarding the unpowered charging device.

In one aspect, an electronic device can include a processing device and a detection unit operably connected to the processing device. The processing device may be adapted to detect an initial engagement with a charging device based on an output of the detection unit, to detect whether the charging device is in an unpowered state, and to provide an alert signal to an alert unit when the charging device is in an unpowered state (e.g., unable to provide power to the electronic device). The alert unit is configured to produce an alert based on the alert signal. Example alert units include, but are not limited to, a haptic device, an audio device, a display, and/or a light source. As such, the alerts may include an audio alert, a visual alert (e.g., an alert message displayed on a display or the light source flashing), and/or a haptic alert.

In another aspect, a method of operating an electronic device can include detecting an initial engagement with a charging device and determining if the charging device is in an unpowered state upon detecting the initial engagement with the charging device. If the charging device is in an unpowered state, one or more alerts may be produced for a user. In some embodiments, one or more alerts may be produced if the charging device is underpowered, where the charging device does not have a sufficient amount of power to provide to the electronic device. The same alert(s) or one or more different alert(s) may be provided to the user after the initial alert or alerts. The alerts can be provided to the electronic device that is engaged with the charging device, the charging device, and/or another electronic device in communication with the charging device.

In yet another aspect, a system includes a charging device and an electronic device. A triggering element may be included in the charging device. The electronic device can include a processing device and a detection unit operably connected to the processing device. The detection unit is configured to engage with the triggering element in the charging device. The processing device is adapted to detect an initial engagement with the charging device based on the triggering element engaging with the detection unit, determine the charging device is not supplying power to the electronic device, and produce an alert signal when the charging device is not supplying power to the electronic device. An alert unit that is operably connected to the processing device is configured to generate an alert based on receipt of the alert signal from the processing device.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims. Identical reference numerals have been used, where possible, to designate identical features that are common to the figures.

DETAILED DESCRIPTION

Figure 1:
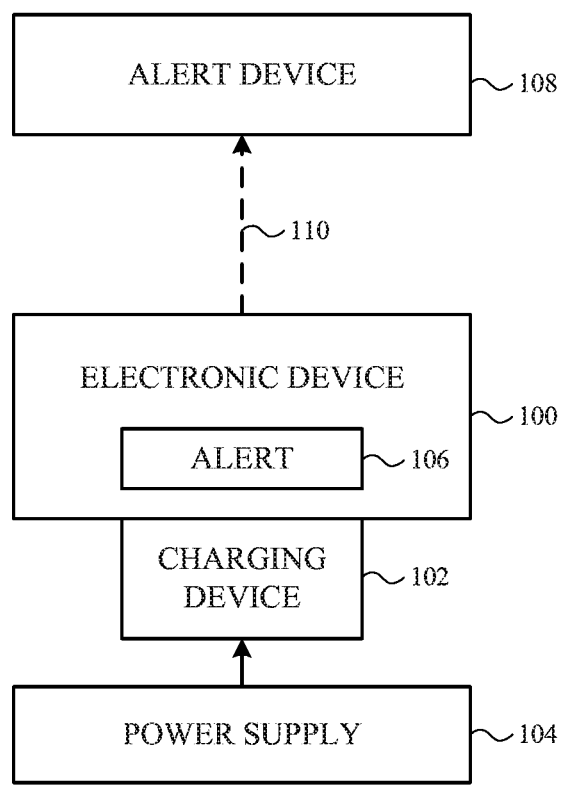
FIG. 1 is a simplified block diagram of a system for detecting and notifying a user of an unpowered charging device.

Embodiments described herein provide various techniques for detecting an unpowered charging device at the time a device to be charged (which may be referred to herein generally as an "electronic device") is initially engaged with the charging device. Generally, embodiments may detect engagement with a charging device and, upon detecting engagement, determine if the charging device is powered or unpowered. Embodiments may include a variety of structures and/or methods for detecting engagement with a charging device. Such structures and/or techniques may be incorporated in a device to be charged or the charging device.

As used herein, the term "unpowered" refers to a state of a charging device in which the charging device is unable to provide either power or another signal to an electronic device that is engaged with the charging device. In one example, a connector of a power cable may be inserted into a port of an electronic device, but if the plug of the power cable is not plugged into a wall outlet, the power cable cannot supply any power to the electronic device. Thus, the power cable is in an unpowered state. Alternatively, in a second example, the plug of the power cable can be plugged into the wall outlet, but the power cable may still be unable to supply any power to the electronic device because the power cable is damaged or defective (e.g., broken). Again, the power cable in this second example is in an unpowered state.

Additionally, as used herein, the terms "engage" and "engagement" refer to a connection between a charging device and an electronic device in which power transfer may occur when the charging device is in a powered state. The connection between the electronic device can be physical (e.g., wired), wireless, or a combination of both. For example, as described earlier, engagement can involve physical insertion where a connector of a charging device (e.g., a power cable, a dock) is inserted into a port of the electronic device. In another embodiment, an electronic device can be engaged with a charging device by mating a portion of the electronic device (e.g., a first surface) with a portion of the charging device (e.g., a second surface). Power can then be transferred wirelessly using near-field techniques (e.g., inductive or magnetic coupling). In yet another embodiment, power may be transferred from a charging device to an electronic device using far-field techniques (e.g., radio waves).

A charging device can include a triggering element that is configured to be sensed by, or to interact with, a detection unit in the electronic device. The triggering element and/or the detection unit may be any suitable electrical, mechanical, optical, magnetic, electromagnetic, or electromechanical device. Embodiments may detect engagement between a device to be charged and a charging device either passively or actively utilizing the triggering element and the detection unit. For example, with active detection, the charging device may transmit a signal or perform an operation that indicates the presence of the charging device to a device to be charged. Additionally or alternatively, the electronic device may transmit a signal to the charging device to detect whether the charging device is present. For example, the electronic device can transmit a signal to the charging device and then wait a given period of time to determine if the charging device responds. The charging device may respond by transmitting a signal to the electronic device and/or by initiating the transfer of power to the electronic device.

With passive detection, a component or device in the charging device may engage or be detected by the electronic device. For example, a triggering element in a charging device may be a magnetic element (e.g., magnet) and the detection unit in the electronic device can be a sensor, such as a Hall Effect sensor, that passively detects the presence and/or field strength of the magnetic element. Thus, the electronic device can detect the presence of the charging device based on the detection of the presence and/or the field strength of the magnetic element.

As another example, the electronic device may optically detect engagement with the charging device. In one example, a predetermined pattern can be provided on a surface of the charging device (e.g., the charging surface of an inductive charging device), and an image sensor may capture an image of the pattern. One example of a predetermined pattern is a bar code. Alternatively, a pattern of different colors and/or shapes on the charging surface may be passively detected optically by an image sensor, none of which necessarily need be detectable by the human eye.

Once the initial engagement between the charging device and the electronic device is detected, the electronic device can determine whether or not the charging device is in an unpowered state. As one example, the electronic device may expect or initiate receipt of power from the charging device. If no power is received by the electronic device after a certain period, then the electronic device may determine from the lack of power that the charging device is unpowered or otherwise deficient or inoperative. Thus, the electronic device may actively detect the presence of the charging device through the aforementioned example structure and passively determine the charging device lacks power due to the failure of the electronic device to receive any power.

In another example, a charging device can include an internal power supply (e.g., a battery) that is configured to temporarily supply power only to a triggering element. For example, a power cable plug or a charging surface can include a light source (e.g., LED) that temporarily emits light of any suitable spectrum toward a light sensor in the electronic device when the charging device is engaged with the electronic device but is in an unpowered state (e.g., the charging device is not plugged into a wall outlet). The flash of light can indicate to the electronic device that the charging device is present and is in an unpowered state. Thus, the charging device may actively indicate its unpowered state to the electronic device.

Additionally, one or more alerts may be provided to the user regarding the unpowered charging device. As one example, an alert message or graphic can be displayed on a display of the electronic device engaged with the charging device. Additionally or alternatively, an audio, visual, and/or haptic alert may be produced by the electronic device. In some embodiments, one or more of these events can occur on another electronic device that is in communication with the electronic device through a wired or wireless connection. In this manner, alerts can be provided to the electronic device engaged with the charging device and/or to one or more other electronic devices the user has designated to receive such alerts.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting.

Referring now to FIG. 1, there is shown a simplified block diagram of a system for detecting and notifying a user of an unpowered charging device. When a user wants to recharge a battery in an electronic device 100, the user engages the electronic device 100 with a charging device 102. The charging device 102 is connected to a power supply 104. In some embodiments, the power supply 104 is an external power supply that the charging device 102 connects to via a power cable (e.g., a power cord, a USB cable). In another embodiment, the power supply 104 may be included in the charging device 102. As one example, the charging device 102 can include a battery. In other embodiments, the power supply can be multiple power supplies (external and/or internal), and the electronic device may determine that all of the power supplies are in an unpowered state.

The charging device 102 is configured to supply at least some of the power received from the power supply 104 to the electronic device 100. In some instances, the charging device 102 is unable to supply power either because the charging device 102 is not connected to the power supply 104 or because the power supply 104 itself is unable to supply power. For example, when the power supply 104 is a wall outlet, the electrical power may be temporarily unavailable (e.g., a power outage) or turned off. In another example, the power supply 104 can be a battery that is connected to the charging device 102. The charging device 102 is not able to supply power to the electronic device 100 when the battery is not charged. Again, this lack of power may be used by the electronic device 100 to passively determine that the charging device 102 is inoperative (e.g., unplugged, unpowered, in a failure state, or the like).

Various techniques and structures are disclosed for detecting the charging device 102 is unable to supply power at the time the electronic device 100 is initially engaged with the charging device 102. Additionally, the electronic device 100 can produce one or more alerts for a user when the electronic device 100 determines the charging device 102 is unable to provide power. In some embodiments, an alert can be produced by one or more alert units 106 in the electronic device 100. In some embodiments, the alert can be a visual, haptic, and/or audio alert. Additionally or alternatively, a user can receive one or more alerts on an alert device 108 that is in communication with the electronic device 100 (wired or wireless communication link illustrated by dashed line 110). The alert device 108 can be any suitable electronic device, such as, for example, a smart telephone, a wearable device, and a tablet or laptop computing device.

Figure 2:
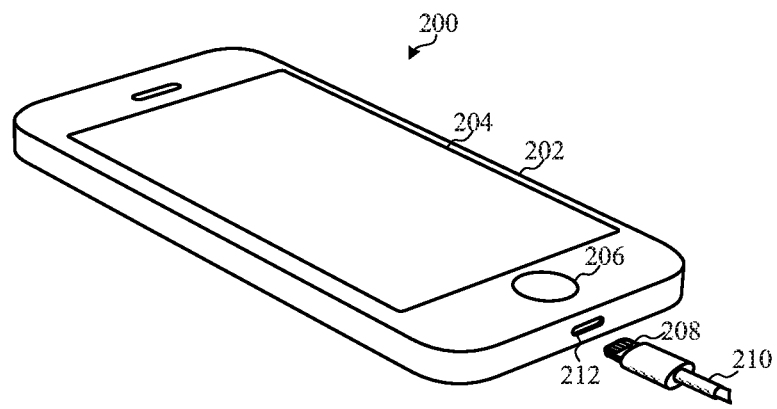
FIGS. 2 and 3 are perspective views of example electronic devices that can be connected to a releasable charging device.
Figure 3:
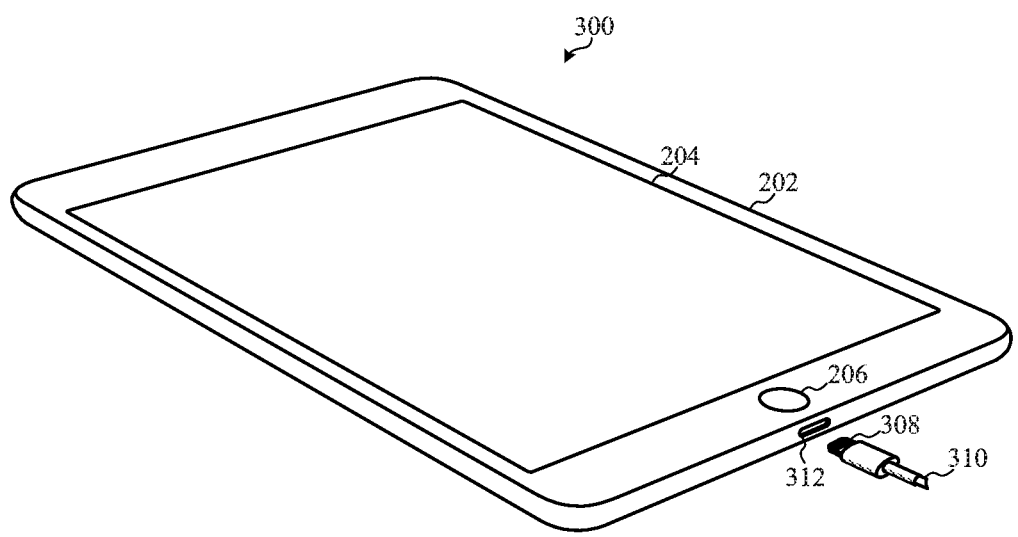

FIGS. 2 and 3 are perspective views of example electronic devices that can be connected to a releasable charging device. The electronic device 200 is depicted as a smart telephone, while the electronic device 300 is a tablet computing device. Other embodiments are not limited to these types of electronic devices. Detection of a charging device and providing an alert when the charging device is unpowered can be used in any suitable electronic device. For example, an electronic device can be a laptop computer, a digital music player, a wearable communication device, a smart watch, a wearable health monitoring device, a remote control device, a gaming device, and any other electronic device that is configured to releasably connect or engage with an external charging device.

The example electronic devices 200, 300 can each include an enclosure 202 that forms an outer surface or partial outer surface for the internal components of the electronic device 200, 300. The enclosure 202 at least partially surrounds a display 204 and one or more input/output devices 206 (shown as a button in this example). The enclosure 202 can be formed of one or more components operably connected together, such as a front piece and a back piece. Alternatively, the enclosure 202 can be formed of a single piece operably connected to the display 204. The enclosure 202 can be formed of any suitable material, including, but not limited to, plastic and metal. In the illustrated embodiment, the enclosure 202 is formed into a substantially rectangular shape, although this configuration is not required.

In some embodiments, the display 204 may incorporate an input device configured to receive touch input, force input, temperature input, and the like. The display 204 can be implemented with any suitable display, including, but not limited to, a multi-touch sensing touchscreen device that uses liquid crystal display (LCD) technology, light emitting diode (LED) technology, organic light-emitting display (OLED) technology, or organic electro luminescence (OEL) technology. The display 204 can be located substantially anywhere on the electronic device 200, 300.

In some embodiments, the input/output device 206 can take the form of an input button, which may be a mechanical button, a soft button (e.g., a button that does not physically move but still accepts inputs), an icon or image on a display, and so on. Further, in some embodiments, the input/output device 206 can be integrated as part of a cover glass of the electronic device. Although not shown in FIGS. 2 and 3, the electronic device 200, 300 can include other types of input/output devices, such as a microphone, a speaker, a camera, a sensor (e.g., biometric) and one or more ports, such as a network communication port.

In the illustrated embodiment, a plug 208, 308 of a charging device 210, 310 (i.e., power cable) is configured to be received by a respective port 212, 312 in the electronic device 200, 300. In some embodiments, the charging device 210, 310 can include a triggering element (not shown) that is configured to be sensed by, or to interact with, a detection unit in the electronic device 200, 300. This interaction or sensing of the triggering element permits the electronic device 200, 300 to detect the presence of the charging device 210, 310 when the charging device 210, 310 is first inserted into the port 212, 312.

Figure 4:
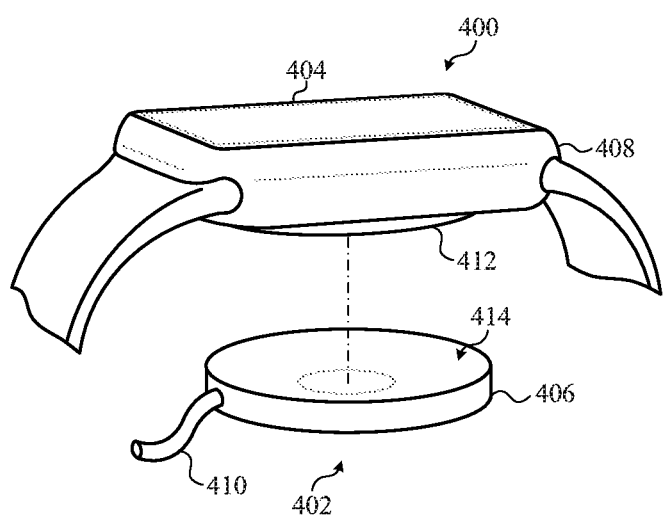
FIG. 4 is a perspective view of another example electronic device and charger device in a disengaged configuration.
Figure 5:
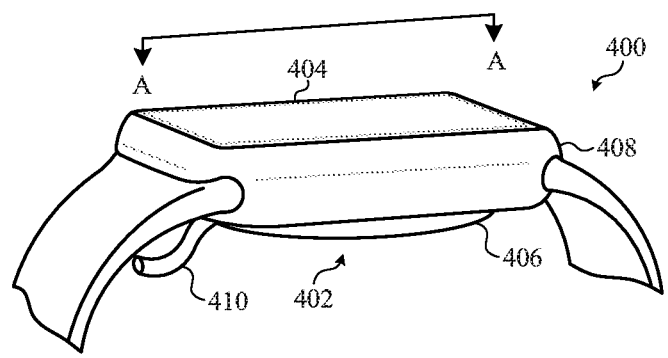
FIG. 5 is a perspective view of the electronic device 404 and the charger device 402 shown in FIG. 4 in an engaged configuration.

Referring now to FIGS. 4 and 5, there are shown perspective views showing another example electronic device and charging device in disengaged and engaged states, respectively. The illustrated electronic device 404 is a wearable communication device that is configured to receive power wirelessly (e.g., inductively) from the charging device 402. The wearable communication device may be configured to provide, for example, wireless electronic communications from other devices, and/or health-related information or data such as (but not limited to) heart rate data, blood pressure data, temperature data, oxygen level data, diet/nutrition information, medical reminders, health-related tips or information, or other health-related data.

Although the system 400 depicts a wristwatch or smart watch, a system can include any electronic device that is configured to receive energy inductively from a charging device. For example, any portable or semi-portable electronic device may receive energy inductively, and any portable or semi-portable docking station or charging device may transmit energy inductively.

The charging device 402 and the electronic device 404 may each respectively include an enclosure 406, 408 to enclose electronic, mechanical and structural components therein. The enclosures 406, 408 are not described in more detail since the enclosures are similar in form and function to the enclosure 202 shown in FIGS. 2 and 3.

In the illustrated embodiment, the charging device 402 may be connected to a power supply by a power cable 410. For example, the charging device 402 can receive power from a wall outlet or from another electronic device through a cable, such as a USB cable. Additionally or alternatively, the charging device 402 may be battery operated. Although the illustrated embodiment is shown with the power cable 410 coupled to the enclosure 406 of the charging device 402, the power cable 410 may be connected by any suitable means. For example, the power cable 410 may be removable and may include a connector that is sized to fit within an aperture or receptacle opened within the enclosure 406 of the charging device 402.

The electronic device 404 may include a first interface surface 412 that may interface with, align, or otherwise contact a second interface surface 414 of the charging device 402. In this manner, the electronic device 404 and the charging device 402 may be positionable with respect to each other. In certain embodiments, the second interface surface 414 of the charging device 402 may be configured in a particular shape that engages with a complementary shape of the electronic device 404 (see FIG. 5). The illustrative second interface surface 414 may include a concave shape that follows a selected curve. The first interface surface 412 of the electronic device 404 may include a convex shape following the same or substantially similar curve as the second interface surface 414.

In other embodiments, the first and second interface surfaces 412, 414 can have any given shape and dimensions. For example, the first and second interface surfaces 412, 414 may be substantially flat. Additionally or alternatively, the charging and electronic devices 402, 404 can be positioned with respect to each other using one or more alignment mechanisms. As one example, one or more magnetic devices may be included in the charging and/or electronic devices 402, 404 and used to align the devices. Additionally, in some embodiments the magnetic elements may be used to detect the presence of the charging device 402 when the electronic device 404 contacts the charging device 402.

In another example, one or more actuators in the charging and/or electronic devices 402, 404 can be used to align the devices. And in yet another example, alignment features, such as protrusions and corresponding indentations in the interface surfaces and/or enclosures of the charging and electronic devices 402, 404, may be used to align the charging and electronic devices 402, 404. The design or configuration of the interface surfaces, one or more alignment mechanisms, and one or more alignment features can be used individually or in various combinations thereof. In some embodiments, the alignment features may be used to detect the presence of the charging device 402 when the electronic device 404 contacts the charging device 402.

Alignment of the devices (whether laterally, transversely, rotationally or otherwise) may facilitate detection of a charging device by an electronic device, especially in situations where a triggering element is asymmetrically or non-uniformly located on a charging device. A "triggering element," as used herein, refers to a structure that permits an electronic device to detect the presence of a charging device. Sample triggering elements are discussed in more detail throughout this specification.

It should be noted that FIGS. 2-4 are illustrative only. In other examples, an electronic device may include different, fewer, or more components than those shown in FIGS. 2-4. For example, in some embodiments an electronic device may not include a display. Additionally or alternatively, an electronic device can include multiple buttons as input/output devices 206, such as a rocker button, a push button, and/or a sliding button.

Figure 6:
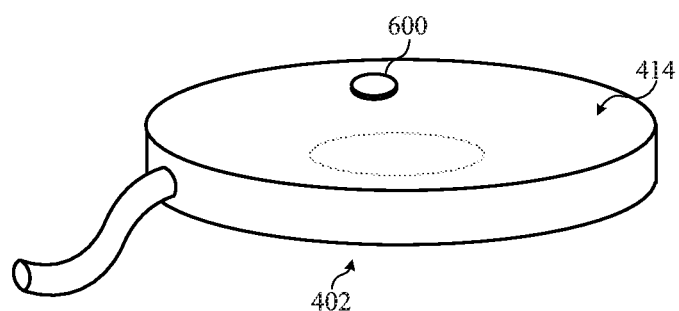
FIGS. 6-10 illustrate example techniques for detecting an external charging device.

FIGS. 6-10 illustrate example techniques for detecting an external charging device. Although the charging device is depicted as the charging device 402 shown in FIGS. 4 and 5, the described techniques can be used with any suitable charging device, including a power cable. A triggering element can be formed at any suitable location in a charging device. As shown in FIG. 6, a triggering element 600 can be formed on the second interface surface 414 of the charging device 402. As one example, the triggering element 600 can be one or more colored and/or differently shaped structural elements, or conductive contacts that may be imaged or detected electrically by the electronic device. In another example, the triggering element 600 can be a predetermined pattern (e.g., a bar code) or a pattern of materials having different absorptive and/or reflective properties that can be imaged or sensed by the electronic device. And in another example, the triggering element 600 may be a mechanical actuator that is configured to activate a corresponding switch in the electronic device.

Figure 7:
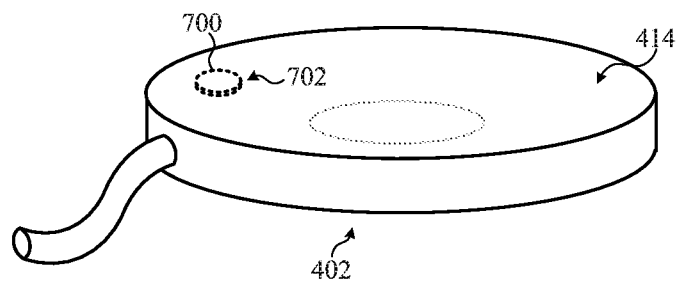

In FIG. 7, the triggering element 700 can be disposed within the charging device 402. As one example, the triggering element 700 may be a first magnetic element positioned at a location in the charging device 402 that corresponds to a location of a sensor, such as a Hall Effect sensor. Alternatively, the electronic device may include a second magnetic element that is operably connected to a switch, and the attractive or repulsive magnetic field produced between the first and second magnetic elements can cause the second magnetic element to activate the switch.

Figure 8A:
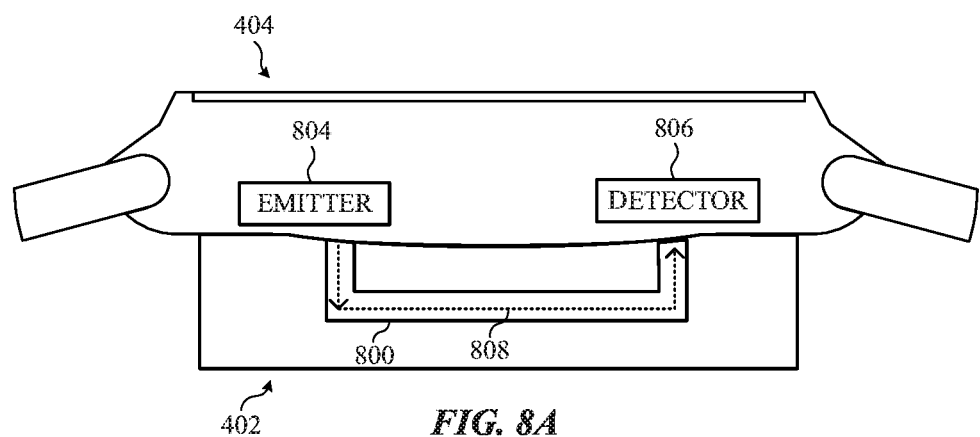

FIG. 8A is a cross-sectional view of one example of the electronic device 404 and the charging device 402 taken along line A-A in FIG. 5. The charging device 402 includes a light pipe 800 and the electronic device 404 includes an emitter 804 and a detector 806 positioned at respective input and output ends of the light pipe 800. In some embodiments, the emitter 804 can be a light source (visible or non-visible light source) and the detector 806 a light sensor. When the emitter 804 is turned on, light 808 can propagate through the light pipe 800. The detector 806 can detect the light produced by the emitter 804 only when the electronic device 404 is resting on the surface of the charging device 402 and the emitter 804 and the detector 806 are aligned with the light pipe 800.

Figure 9A:
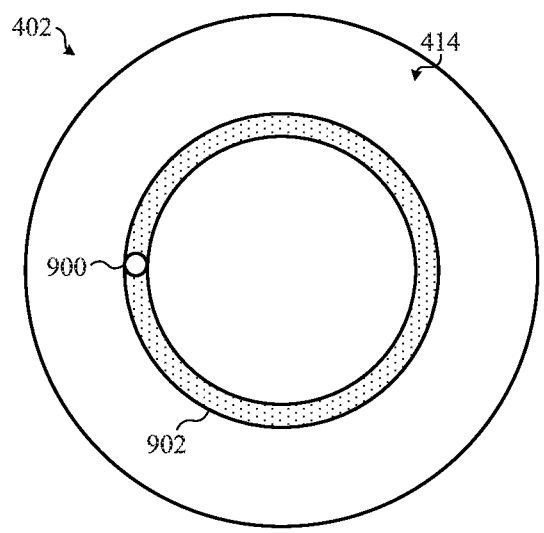

FIG. 9A is a top view of the second interface surface 414 of the charging device 402 (FIG. 4). In one embodiment, the emitter 804 emits light into the input opening 900 and the light pipe 800 forms a ring 902 that emits light from the second interface surface 414 when the emitter 804 is turned on. In the illustrated embodiment, the ring 902 is a continuous ring. In other embodiments, or one or more discrete points or segments can be used to detect the presence of the charging device 402. The one or more discrete points can be any suitable shape (e.g., circular). Additionally, multiple discrete points may be positioned in an annular arrangement or any other suitable arrangement.

Figure 8B:
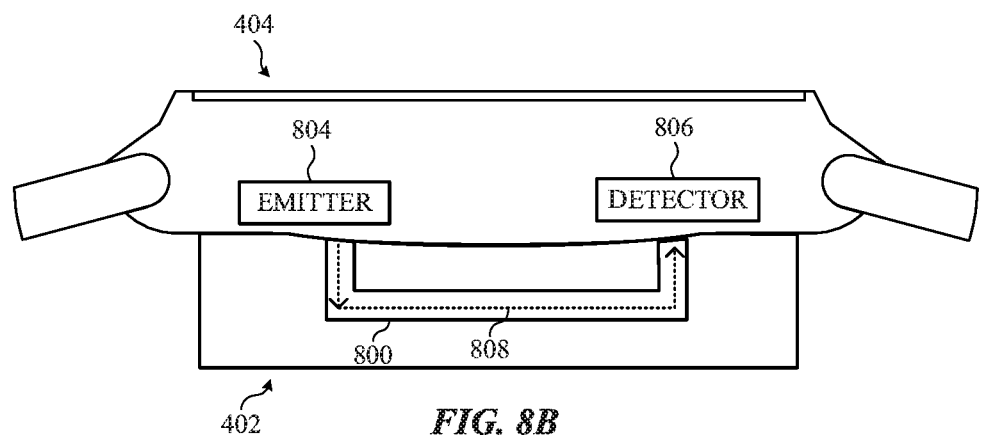
Figure 9B:
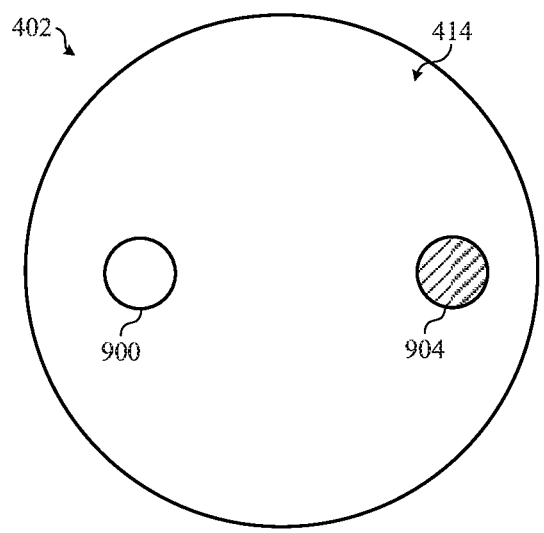

FIG. 8B is a cross-sectional view of another example of the electronic device 404 and the charging device 402 taken along line A-A in FIG. 5. The charging device 402 includes a light pipe 800 and the electronic device 404 includes the emitter 804 and the detector 806. When the emitter 804 is turned on, light 808 propagates through the light pipe 800 to the detector 806. The detector 806 can detect the light 808 when the electronic device 404 is in contact with the charging device 402. FIG. 9B is a top view of the second interface surface 414 of the charging device 402 (FIG. 4). In the illustrated embodiment, the emitter 804 emits light 808 into the input opening 900 of the light pipe 800 and the light pipe 800 emits light 808 at the output opening 904 such that light 808 emits from the second interface surface 414.

Figure 8C:
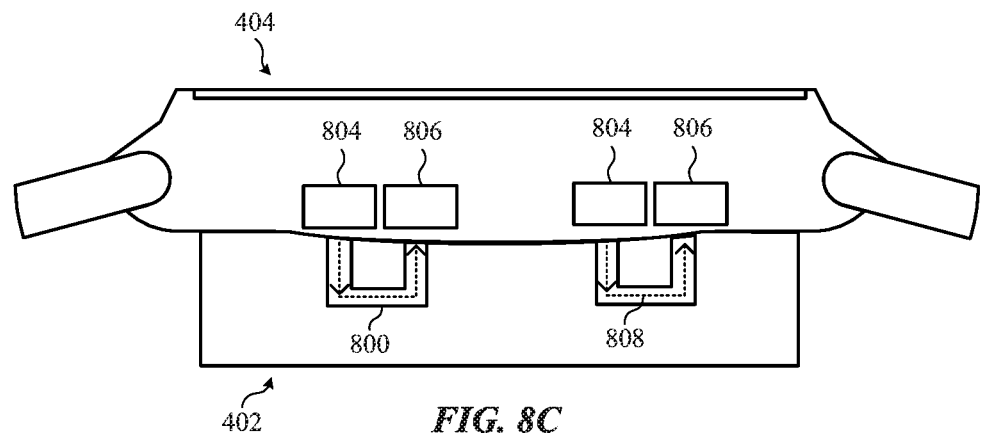
Figure 9C:
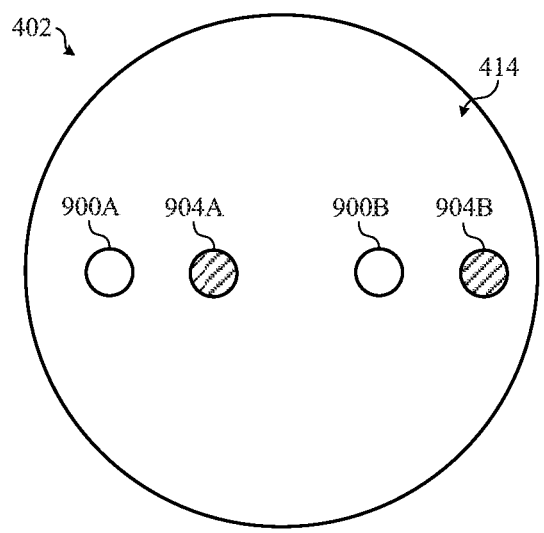

FIG. 8C is a cross-sectional view of yet another example of the electronic device 404 and the charging device 402 taken along line A-A in FIG. 5. The charging device 402 includes multiple light pipes 800 and the electronic device 404 includes multiple emitters 804 and detectors 806. When at least one emitter 804 is turned on, light 808 propagates through the corresponding light pipe 800 to a respective detector 806. FIG. 9C is a top view of the second interface surface 414 of the charging device 402 (FIG. 4). In the illustrated embodiment, each emitter 804 can emit light 808 into a respective input opening 900A, 900B and the light pipe 800 emits light 808 at a corresponding output opening 904A, 904B such that light 808 emits from the second interface surface 414. The emitters 804 can be turned on individually, in different groups, or all at once. Additionally, each emitter 804 can emit the same wavelength of light, or at least one emitter 804 can emit a wavelength of light that differs from the wavelengths emitted by the other emitter(s) 804. Other embodiments can configure the light pipes 800 differently to pair an emitter 804 with a different detector 806. In this manner, a different arrangement of discrete points may be produced.

Figure 10:
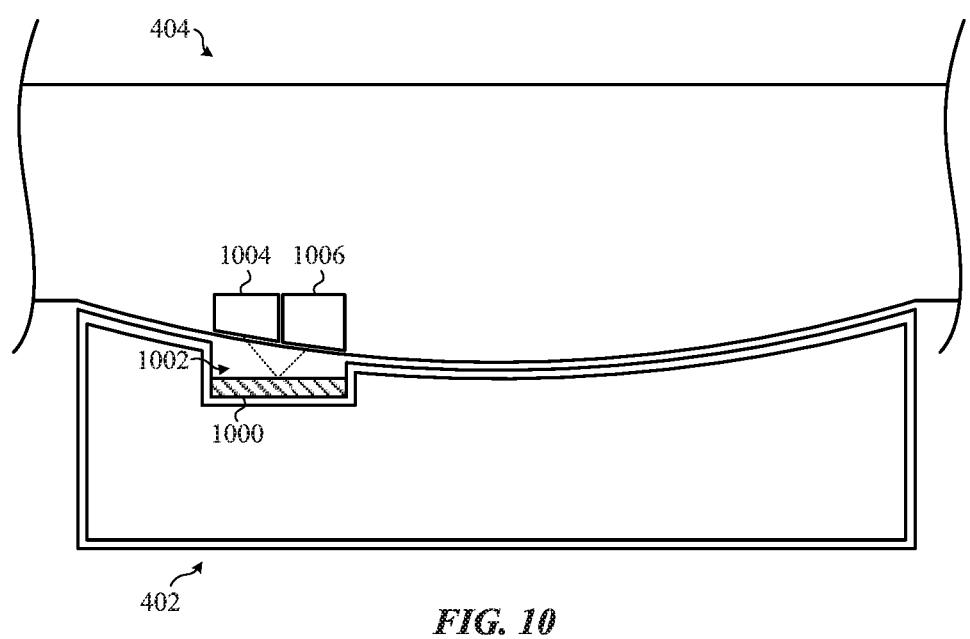

FIG. 10 depicts an enlarged cross-sectional view of the charging device 402 and the electronic device 404 taken along line A-A in FIG. 5. In the illustrated embodiment, a triggering element 1000 is positioned in an aperture 1002 formed in the second interface surface 414. In some embodiments, the triggering element 1000 may be a pattern that is formed over one or more surfaces in the aperture 1002. In FIG. 10, the triggering element 1000 is formed on a bottom surface of the aperture 1002. For example, the triggering element 1000 can be a bar code or a pattern of materials having different absorptive and/or reflective properties that can be imaged or sensed by the electronic device 404. In some embodiments, the aperture 1002 may engage with a structure on the back of the electronic device 404 in order to align the electronic device 404 and charging device 402, thereby facilitating detecting of the triggering element 1000.

A light source 1004 in the electronic device 404 may be positioned to emit light towards the triggering element 1000 and a light sensor 1006 in the electronic device 404 can be positioned to receive light reflected off the triggering element 1000. Alternatively, in one embodiment, an image sensor in the electronic device 404 can be positioned to capture an image of the illuminated triggering element 1000. In another embodiment, the charging device 402 may include a light source 1004 that is positioned to illuminate the triggering element 1000, a light sensor 1006 that can detect the reflected light, or an image sensor that can capture an image of the triggering element 1000.

Various embodiments may use other methods, triggering elements, techniques, and other structures to determine when a charging device is engaged. Sample embodiments and detection units/triggering elements will now be described.

In some embodiments, the alignment of the electronic device may shift with respect to the charging device. As described earlier, the proper alignment of the electronic device to the charging device can be effectuated by complementary curved first and second interfacing surfaces, actuators, magnets, and the like.

In some embodiments, an electrical element can be included in a plug, and the electrical element may complete a circuit in the electronic device. Alternatively, a proximity sensor may be included in a port or aperture that receives a plug of the charging device. A processing device in the electronic device can monitor the output of the proximity sensor or the output of the circuit (e.g., current or voltage) to detect the presence of the charging device.

In some embodiments, the electronic device may detect engagement with the charging device through optical detection. In one example, a bar code or matrix bar code can be provided on a surface of the charging device (e.g., the charging surface of an inductive charging device), and an image sensor may capture an image of the bar code. Alternatively, a pattern of different colors and/or shapes on the charging surface may be detected optically by an image sensor. In another example, the charging surface on a charging device can be textured, or may be formed from materials having different reflective and/or absorptive characteristics, both of which can be detected by an image sensor. In yet another example, a power cable plug or a charging surface can include a light source (e.g., LED) that emits light toward a light sensor in the electronic device when the charging device is engaged with the electronic device and able to supply power to the electronic device (e.g., the charging device is plugged into a wall outlet). A processing device in the electronic device can analyze the images or output of the light sensor to detect the presence of the charging device.

Figure 11:
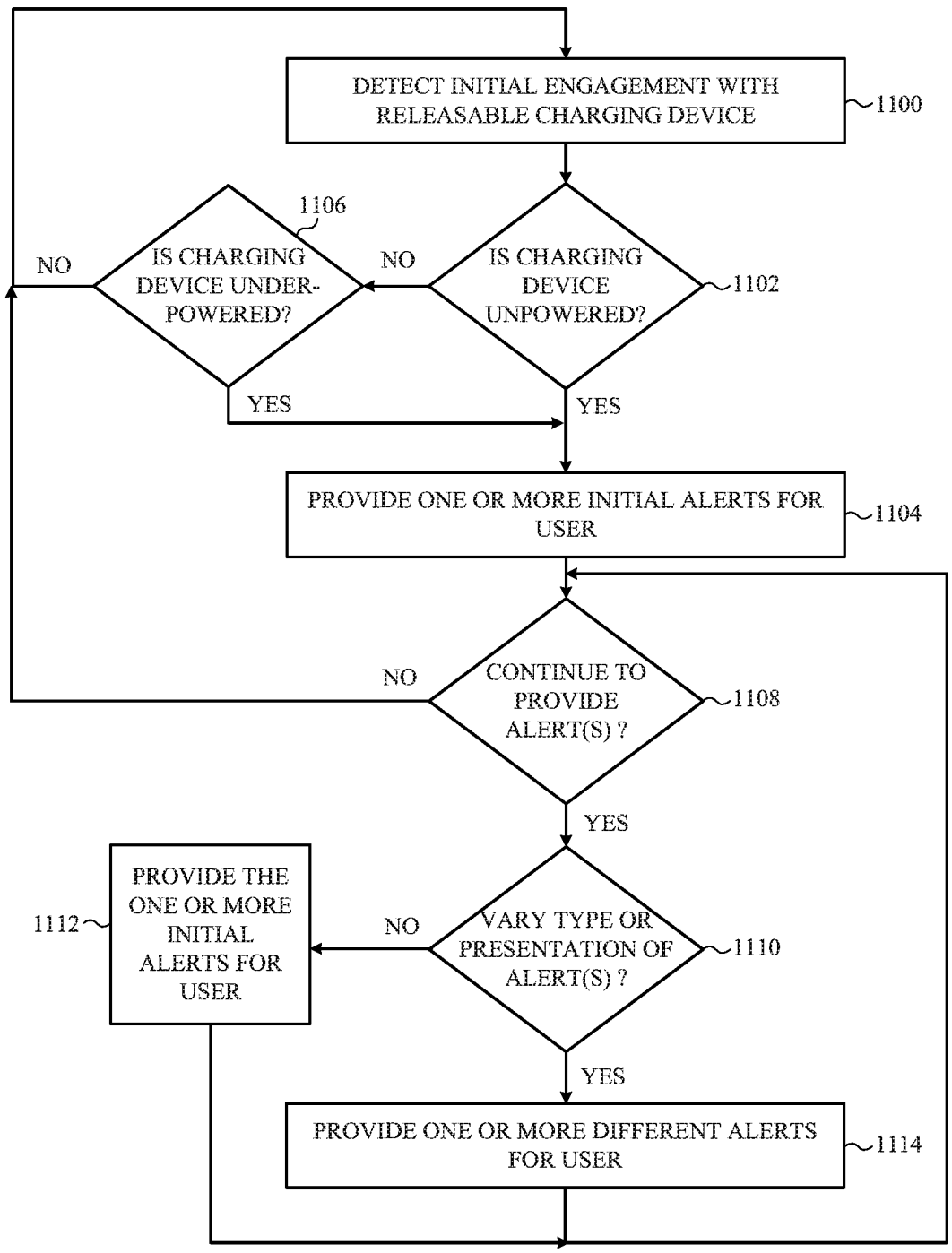
FIG. 11 is a flowchart of a method of detecting and notifying a user of an unpowered charging device.

Referring now to FIG. 11, there is shown a flowchart of a method of detecting and notifying a user of an unpowered charging device. Initially, as shown in block 1100, an electronic device can detect an initial connection or engagement with a charging device. Various techniques can be used to detect the initial engagement with a charging device. As one example, a mechanical element can be included in a charging surface or in a plug that is received by a port in the electronic device. The mechanical element may actuate a switch within the electronic device. A processing device in the electronic device can monitor the state of the switch to detect the presence of the charging device. As another example, as described earlier, a charging device can include a magnetic element (e.g., magnet) and the electronic device a sensor, such as a Hall Effect sensor, that detects the presence and/or field strength of the magnetic element. The electronic device can detect the presence of the charging device based on the detection of the presence and/or the field strength of the magnetic element. Other sample structures and triggering elements, including optical detection, may be used as described elsewhere herein.

Referring now to block 1102 in FIG. 11, a determination may be made as to whether the charging device is in an unpowered state after the initial engagement with the electronic device. For example, a processing device in the electronic device can monitor a signal line connected to a battery to detect if a signal level (e.g., current or voltage) on the signal line is sufficient to recharge the battery (e.g., the signal level equals or exceeds a threshold level). Similarly, a signal will not be provided to a battery when an inductive charging device is not plugged into a wall outlet. In another example, an electronic device that receives power wirelessly can "ping" the charging device through the inductive power transfer receiver and wait for a reply ping or the transfer of power from the inductive power transfer transmitter in the charging device. A "ping" is a short burst of energy that is transferred to the charging device or from the charging device. The electronic device may determine the charging device is not able to supply power when a reply ping is not received from the charging device, or when the charging device does not begin to transfer power to the electronic device.

If the charging device is in an unpowered state, the process passes to block 1104 where one or more initial alerts are provided to the user. As one example, an alert message or graphic can be displayed on a display of the electronic device engaged with the charging device. Additionally or alternatively, an audio, visual, and/or haptic alert may be produced by the electronic device. As will be described in more detail later, in some embodiments one or more of these events can occur on another electronic device that is in communication with the electronic device through a wired or wireless connection. In this manner, alerts can be provided to the electronic device engaged with the charging device and/or to one or more other electronic devices the user has designated to receive such alerts.

Returning to block 1102, when the charging device is able to supply power to the electronic device (charging device is in a powered state), the method can pass to block 1106 where a determination is made as to whether the charging device is underpowered when initially engaged with the electronic device. For example, the electronic device may be connected to an external battery device for power or recharging. The electronic device may detect the amount of charge on the battery pack, or the external battery pack can transmit data to the electronic device regarding the remaining charge on the battery pack. If the remaining charge is insufficient to recharge the battery to a given level (e.g., a threshold level), or to provide power for a given amount of time, the method continues at block 1104. Otherwise, the process returns to block 1100. In this manner, the electronic device detects whether the charging device is able to supply sufficient power only when the electronic device is first engaged with the charging device. The subsequent reduction in the amount of available power and/or a subsequent loss of power is not detected by the electronic device, and alerts are not produced when one of the events occurs.

Once an initial alert or alerts is provided at block 1104, the method may continue at block 1108 where a determination is made as to whether the electronic device will continue to provide the alert(s) periodically or at select times after the initial alert(s). For example, an alert or alerts may be produced after a given amount of time has passed since the initial alert and the external charging device remains in an unpowered state. The process returns to block 1100 if the electronic device will not provide a subsequent alert(s) for the user. Thus, the electronic device produces an alert or alerts regarding the unpowered state of the charging device only when the electronic device is first engaged with the charging device. A subsequent reduction in the amount of available power and/or a subsequent loss of power is not detected by the electronic device, so alerts are not produced when one of the events occurs.

When the electronic device will provide one or more subsequent alerts for the user, the method may pass to block 1110 where a determination is made as to whether the type of alert and/or the presentation of the alert will change. For example, an alert different from the initial alert can be produced. As one example, the initial alert may be an audio alert and a subsequent alert can be a visual alert (e.g., alert message). Additionally or alternatively, the electronic devices that receive the alert(s) (e.g., the presentation of the alert) can change or be supplemented. For example, in some embodiments, one or more subsequent alerts may be received by a device other than (or in addition to) the electronic device engaged with the external charging device.

If the type and/or presentation of alert(s) will not vary, the process continues at block 1112 where the one or more initial alerts are produced for the user again. The method then returns to block 1108. When the type and/or presentation of alert(s) will vary, the method passes to block 1114 where one or more different alerts are produced for the user. The process then returns to block 1108. For example, an audio alert may be provided when the unpowered charging device is initially engaged with, or connected to, the electronic device 404. Thereafter, a visual alert, such as an alert message on a display or the activation of an LED light source for a given period of time, may be produced.

Figure 12:
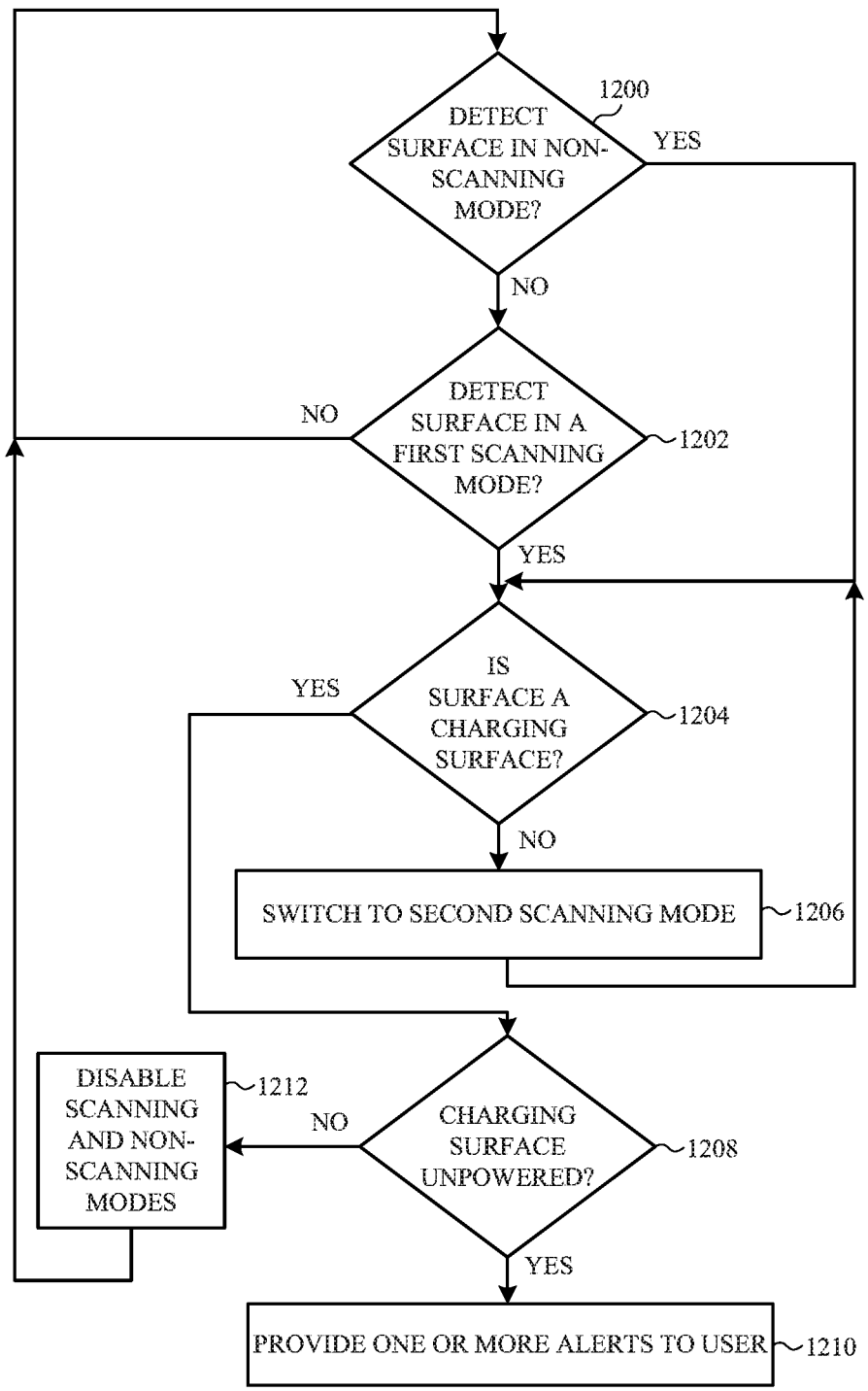
FIG. 12 is a flowchart of a method of operating an electronic device.

FIG. 12 is a flowchart of a method of operating an electronic device. Initially, as shown in block 1200, a determination may be made as to whether the electronic device detects a surface while the electronic device is in a non-scanning mode. A non-scanning mode is a mode where the electronic device is not trying to detect the presence of a charging device (e.g., charging device 402). However, while in the non-scanning mode, another sensor or device in the electronic device may detect the presence of a surface. For example, a proximity sensor can detect when an electronic device is in contact with a surface. In another example, a processing device in the electronic device can monitor the output of one or more sensors, such as an accelerometer, a touch sensor, a force sensor, and/or a biometric sensor to determine if the electronic device is moving or if a user is interacting with the electronic device. The electronic device can remain or enter in a non-scanning mode when the electronic device is moving and/or the user is interacting with the electronic device (or may decrease the frequency of a scanning mode as an alternative).

If the electronic device does not detect the presence of a surface while the electronic device is in a non-scanning mode, the process passes to block 1202 where a determination may be made as to whether the electronic device detects a surface while the electronic device is in a first scanning mode. A scanning mode is a mode where the electronic device is attempting to detect the presence of the charging device. The first scanning mode may continuously check for the presence of a charging device, or the first scanning mode can scan for the presence of the charging device at select times (e.g., with a given time interval between detection scans). As one example, a scanning operation can be performed according to a schedule.

If the electronic device detects the presence of a surface while in the non-scanning mode (block 1200) or while in the first scanning mode (block 1202), the method continues at block 1204 where the electronic device determines if the surface is a charging surface of a charging device. Any one of the techniques described earlier can be used to determine whether the surface is a charging surface. For example, the charging surface can include one or more triggering elements such as colored and/or differently shaped structural elements, a pattern, or conductive contacts that may be imaged or detected electrically by the electronic device. In another example, the charging device may include a light pipe that propagates light from an emitter in the electronic device to a detector in the electronic device.

If the surface is not a charging surface, the method continues at block 1206 where the electronic device switches to a second scanning mode. In the second scanning mode, the electronic device can continue to determine if the surface is a charging surface with a greater time interval between detection scans. For example, a user may slide the electronic device onto a charging surface, and the electronic device can subsequently determine if the surface is a charging surface in accordance with the second scanning mode. In some embodiments, if the electronic device determines that it is placed on a surface other than a charging device the electronic device may halt any active scans until it detects that it is moving or has moved based on signals produced by a motion detector (e.g., an accelerometer). Alternatively, the electronic device may determine that it is on a surface other than a charging device by determining it is stable (e.g., no motion detected by a suitable motion sensor) for a certain period of time during which the electronic device fails to detect a triggering element or other charging device indicator. By halting scanning operations or decreasing a frequency of such operations while on a non-charging surface, the electronic device may conserve its power. In some embodiments, the process can return to block 1200 instead of switching to the second scanning mode.

If the surface is a charging surface (block 1204), the method passes to block 1208 where the electronic device determines if the charging surface is in an unpowered state. As one example, a processing device in the electronic device can monitor the signal produced by the inductive power transfer receiver. If the signal level is insufficient to charge the battery, the processing device may determine the charging device is not able to provide power. For example, the charging device may not be plugged into a wall outlet. In some embodiments, the charging device may have an internal power supply that temporarily supplies power to the charging device when the charging device is in an unpowered state. In such embodiments, the charging device can provide a communication signal to the electronic device that informs the electronic device that the charging device is not plugged into a wall outlet. The communication signal may also provide information about the level of charge in the battery. Based on the communication signal, the electronic device can provide one or more alerts for the user. For example, the charging device can transmit the communication signal to the electronic device via a wired or wireless communication link.

In some embodiments, the electronic device may be able to transmit power to the charging device to power one or more alert units in the charging device. For example, the charging device may include a light source (e.g., LED light) that provides an alert to the user that the charging device is unpowered. In such embodiments, an alert unit may not be included in the electronic device, which can reduce the number of components in the electronic device.

Returning to block 1208, if the charging surface is in an unpowered state, the process can pass to block 1210 where the electronic device provides one or more alerts for the user. If the charging surface is in a powered state, the method continues at block 1212 where the scanning and non-scanning modes are disabled while the electronic device is receiving power from the charging device.

In some embodiments, a wearable electronic device, such as a watch, can be configured to determine when a user is wearing the wearable electronic device. As one example, a wearable electronic device can include a proximity sensor, and a processing device may monitor the output of the proximity sensor to determine if the user is wearing the electronic device. Alternatively, the wearable device can use a capacitive sensor or other suitable sensor to detect when the band is closed or unclasped. The wearable electronic device may enter a scanning mode when the user is not wearing the electronic device. The electronic device can enter or remain in a non-scanning mode when the user is wearing the electronic device. In this manner, the electronic device can operate in a scanning mode where the electronic device checks for the presence of the charging device only after other conditions or events have occurred. When the other conditions or events have not occurred, the electronic device may operate in a non-scanning mode where the electronic device does not attempt to detect the charging device.

Other embodiments can perform the blocks shown in FIGS. 11 and 12 in a different order and/or can add or omit blocks. As one example, block 1106 may be omitted in one embodiment. Additionally or alternatively, blocks 1108, 1110, 1112, and 1114 can be omitted in another embodiment. In FIG. 12, block 1206 and/or block 1212 may be omitted in other embodiments.

Figure 13:
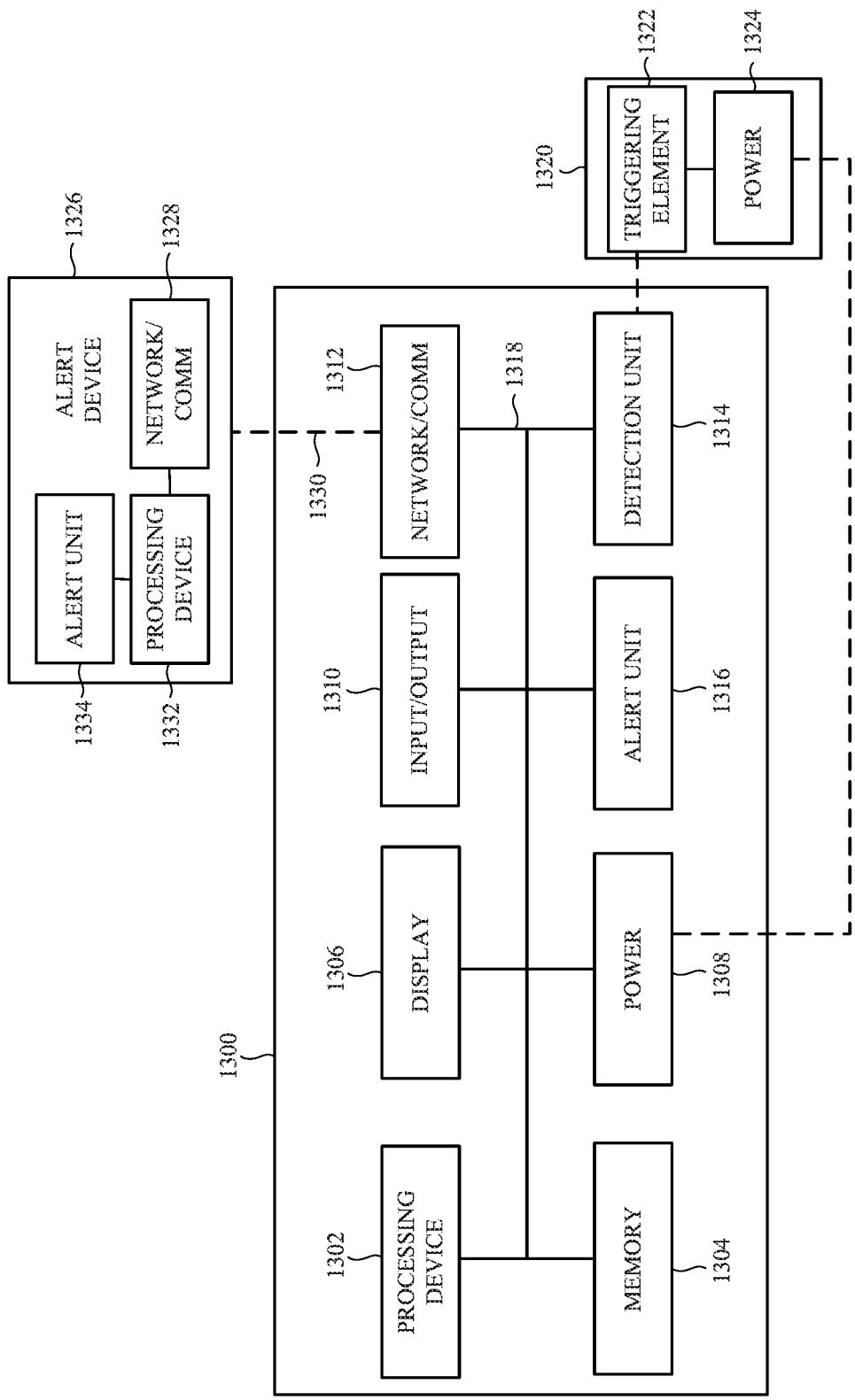
FIG. 13 illustrates a first example block diagram of an electronic device that can detect a charging device and provide an alert to another electronic device.

Referring now to FIG. 13, there is shown a first example block diagram of an electronic device that can detect a charging device and provide an alert to an alert device. The electronic device 1300 is suitable for use as the electronic devices 200 and 300 shown in FIGS. 2 and 3, respectively. The electronic device 1300 can include one or more processing devices 1302, memory 1304, a display 1306, a power supply 1308, one or more input/output (I/O) devices 1310, a network/communication interface 1312, a detection unit 1314, and an alert unit 1316, each of which will be discussed in turn below.

The one or more processing devices 1302 can control some or all of the operations of the electronic device 1300. The processing device(s) 1302 can communicate, either directly or indirectly, with substantially all of the components of the device. For example, one or more system buses 1318 or other communication mechanisms can provide communication between the processing device(s) 1302, the memory 1304, the display 1306, the power supply 1308, the I/O device(s) 1310, the network/communication interface 1312, the detection unit 1314, and/or the alert unit 1316. At least one processing device can be configured to detect an external charging device 1320 that is engaged with the electronic device 1300. Additionally, a processing device 1302 may be configured to cause an alert to be produced when the external charging device is in an unpowered state (e.g., a power cable is not plugged into a wall outlet).

The processing device(s) 1302 can be implemented as any electronic device capable of processing, receiving, or transmitting data or instructions. For example, the one or more processing devices 1302 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

The memory 1304 can store electronic data that can be used by the electronic device 1300. For example, the memory 1304 can store electrical data or content such as audio files, document files, timing and control signals, operational settings and data, and image data. The memory 1304 can be configured as any type of memory. By way of example only, memory 1304 can be implemented as random access memory, read-only memory, Flash memory, removable memory, or other types of storage elements, in any combination.

The display 1306 can provide a visual output to the user. The display 1306 can be implemented with any suitable technology, including, but not limited to, a multi-touch sensing touchscreen that uses liquid crystal display (LCD)

technology, light emitting diode (LED) technology, organic light-emitting display (OLED) technology, organic electroluminescence (OEL) technology, or another type of display technology. In some embodiments, the display 1306 can function as an input device that allows the user to interact with the electronic device 1300. For example, the display can be a multi-touch touchscreen display.

The power supply 1308 can be implemented with any device capable of providing energy to the electronic device 1300. For example, the power supply 1308 can be one or more batteries or rechargeable batteries, or a connection cable that connects the electronic device to another power supply such as a wall outlet.

The one or more I/O devices 1310 can transmit and/or receive data to and from a user or another electronic device. Example I/O device(s) 1310 include, but are not limited to, a touch sensing input device such as a touchscreen or track pad, one or more buttons, a microphone, a haptic device, and/or a speaker.

The network/communication interface 1312 can facilitate transmission of data to or from other electronic devices. For example, a network/communication interface can transmit electronic signals via a wireless and/or wired network connection. Examples of wireless and wired network connections include, but are not limited to, cellular, Wi-Fi, Bluetooth, infrared, RFID, Ethernet, and NFC.

The detection unit 1314 can be any suitable electrical, mechanical, optical, magnetic, electromagnetic, or electromechanical device that is configured to detect a triggering element 1322 in an external charging device 1320. Similarly, the triggering element 1322 may be any suitable electrical, mechanical, optical, magnetic, electromagnetic, or electromechanical device that is configured to interact with the detection unit 1314. For example, a triggering element 1322 may be a contact pad connected to a circuit, a magnetic element operably connected to a Hall Effect sensor, a light source, or a pattern formed on or in a plug or charging surface of a charging device.

The detection unit 1314 detects the presence of the charging device 1320 when the charging device is first engaged with, or connected to, the electronic device 1300. For example, a detection unit 1314 includes, but is not limited to, a switch, a magnetic element, an optical sensor, a PPG sensor, and an image sensor. The processing device 1302 is adapted to detect the charging device 1320 by monitoring, receiving, and/or analyzing the state, an output signal, or data produced by the detection unit 1314. The processing device 1302 is further adapted to determine whether the power supply 1308 is receiving power 1324 from the external charging device 1320.

The processing device 1302 may provide alert control and timing signals to one or more alert units 1316, and each produces an output designed to alert a user to the unpowered state of the external charging device 1320. In some embodiments, an alert unit can include the display 1306 and/or one or more input/output devices 1310 (e.g., speakers, haptic device). Additionally or alternatively, an alert unit 1316 can be a device that is used only for the alerts. For example, the alert unit 1316 may be a light source that is turned on or flashed when a charging device is in an unpowered state.

The processing device 1302 can cause one or more alerts to be produced when the unpowered external charging device 1320 is initially engaged with, or connected to, the electronic device 1300. Additionally, the processing device 1302 can cause the one or more alerts to be provided to the user periodically or at select times after the initial alert(s) was produced based on the determination that the external charging device 1320 was in an unpowered state when the external charging device 1320 was first engaged with the electronic device 1300. Additionally or alternatively, the processing device 1302 may supplement or vary the number and types of electronic devices that receive the alerts. For example, the processing device 1302 may transmit timing and control signals to an alert device 1326 that is in communication with the electronic device 1300 via the network/communication interfaces 1312 and 1328. The network/communication interfaces 1312, 1328 can be used to establish a communication link 1330 between the electronic device 1300 and the alert device 1326. The communication link 1330 may be implemented as a physical link or as a wireless link.

In some embodiments, the alert device 1326 is a second electronic device such as a smart telephone, a tablet computing device, or a laptop or desktop computer. The alert timing and control signals sent to the alert device 1326 can be received by a processing device 1332, which causes one or more alert units 1334 to produce an alert for a user. As one example, the alert unit 1334 can include a haptic device, a display, a light source, and/or speakers that respectively produce a haptic alert, a first visual alert (e.g., an alert message), a second visual alert (e.g., a flashing light), and/or an audio alert. The alert device 1326 can produce the one or more alerts in combination with the electronic device 1300, or the alert device 1326 can provide the alert(s) instead of the electronic device 1300. Additionally, the processing device 1302 may transmit the alert timing and control signals to one or more external electronic devices.

In some embodiments, a user can specify the type of alert to be produced when the electronic device is first engaged with a charging device and the electronic device determines the charging device is in an unpowered state. For example, a user may elect to receive a haptic alert at a smart telephone because the user typically carries the smart telephone in his or her pocket. Additionally, the user may specify the alert type based on one or more factors, such as the day of the week (e.g., weekday vs. weekend) and/or the time of day. As one example, Mondays through Fridays a user may elect to receive a visual alert at a computer during work hours and at all other times the user may want to receive an audio alert at a smart telephone because the user carries the smart telephone in a pocket or places the smart telephone on a nearby surface (e.g., a table or a nightstand).

As one example, the electronic device can be a smart watch and the alert device a smart telephone. The smart watch and the smart telephone can be in communication with each other via a wireless communication link. When the smart watch is first engaged with a charging device, the smart watch can determine if the charging device is in an unpowered state and if so, the smart watch can provide one or more alerts to the user. Additionally or alternatively, the smart watch may transmit alert timing and control signals to the smart telephone and the smart telephone can produce one or more alerts for the user. In some embodiments, the charging device can include an internal power supply (e.g., a battery) that is configured to temporarily supply power only to a triggering element. For example, the charging device can include a light source (e.g., LED) that receives light from the internal power supply to briefly emit light of any suitable spectrum toward a light sensor in the electronic device when the charging device is engaged with the electronic device and is in an unpowered state. The flash of light produced by the charging device may indicate to the electronic device that the charging device is present but is in an unpowered state.

Figure 14:
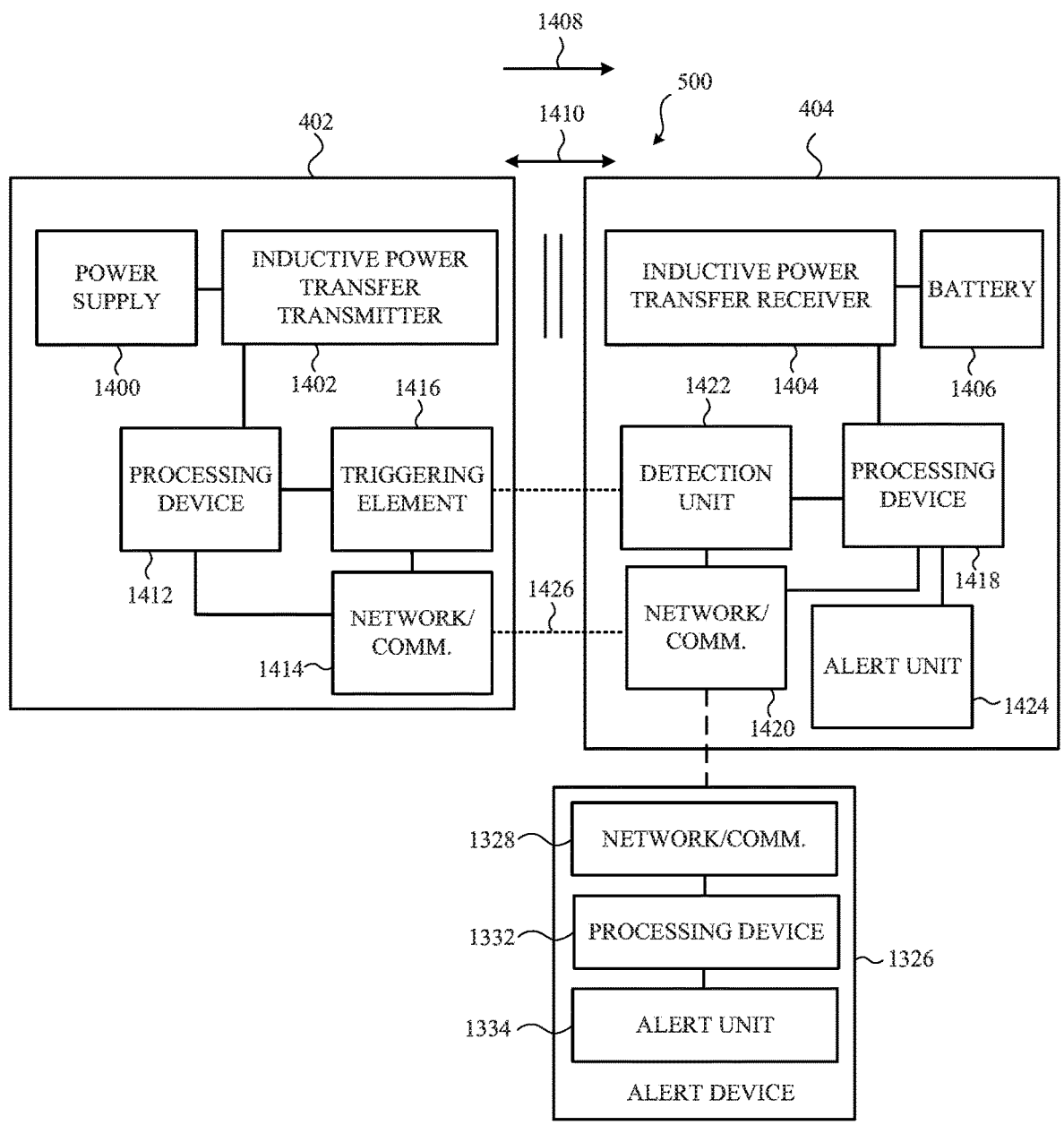
FIG. 14 depicts a second example block diagram of an electronic device that can detect a charging device and provide an alert to another electronic device.

Referring now to FIG. 14, there is shown a second example block diagram of an electronic device that can detect a charging device and provide an alert to an alert device. The electronic device is suitable for use as the electronic device 404, and the charging device is suitable for use as the charging device 402 shown in FIGS. 4 and 5. The charging device 402 includes a power supply 1400 operably connected to an inductive power transfer transmitter 1402. In one embodiment, the inductive power transfer transmitter 1402 includes a DC-to-AC converter operably connected to a transmitter coil. As described earlier, an example power supply includes, but is not limited to, a wall outlet or another electronic device that is connected to the charging device 402 by a power cable (see 410 in FIG. 4).

The electronic device 404 can include an inductive power transfer receiver 1404. In some embodiments, the inductive power transfer receiver 1404 includes a receiver coil operatively connected to an AC-to-DC converter. The inductive power transfer receiver 1404 is operably connected to a load, such as a rechargeable battery 1406.

The transmitter coil and the receiver coil together form a transformer. The transformer transfers power through inductive coupling between the transmitter coil and the receiver coil (energy transfer represented by arrow 1408). Essentially, energy is transferred from the transmitter coil to the receiver coil through the creation of a varying magnetic flux by an AC signal flowing through the transmitter coil. The varying magnetic flux induces a current in the receiver coil. The AC signal induced in the receiver coil is converted into a DC signal. The DC signal is used to charge the battery 1406. Additionally or alternatively, the transferred energy can be used to transmit communication signals between the electronic device 404 and the charging device 402 (communication signals represented by arrow 1410).

A processing device 1412 in the charging device 402 can be operatively connected to the inductive power transfer transmitter 1402, a network/communication interface 1414, and optionally to a triggering element 1416. Although not shown in FIG. 14, the processing device 1412 may be operatively connected to other components (e.g., display, sensor, memory) in the charging device 402. The processing device 1412 may control or monitor the operations of the inductive power transfer transmitter 1402, the network/communication interface 1414, and/or the triggering element 1416.

A processing device 1418 in the electronic device 404 can be operatively connected to the inductive power transfer receiver 1404, a network/communication interface 1420, a detection unit 1422, and an alert unit 1424. Although not shown in FIG. 14, the processing device 1418 may be operatively connected to other components (e.g., display, sensor, memory) in the electronic device 404. The processing device 1418 may control or monitor the operations of the inductive power transfer receiver 1404, the network/communication interface 1420, the detection unit 1422, and/or the alert unit 1424.

The processing devices 1412, 1418 and the network/communication interfaces 1414, 1420, may be similar in form and function to the processing device 1302 and the network/communication interface 1312 shown in FIG. 13, and as such these components are not described in more detail herein. The network/communication interfaces 1414, 1420 can be used to establish a communication link 1426 between the electronic and charging devices. Additionally, as described earlier, inductive energy transfer can be used for communication between the electronic and charging devices (see arrow 1410). The communication link 1426 is an additional communication mechanism that is separate from inductive energy transfer.

Like the detection unit 1314 in FIG. 13, the detection unit 1422 can be any suitable electrical, mechanical, optical, magnetic, electromagnetic, or electromechanical device that is configured to detect the triggering element 1416 in the charging device 402. Additionally, the triggering element 1416 may be any suitable electrical, mechanical, optical, magnetic, electromagnetic, or electromechanical device that is configured to interact with the detection unit 1422. For example, a triggering element 1416 may be a contact pad connected to a circuit, a magnetic element, a light source, or a pattern formed on or in a plug or charging surface of a charging device.

The detection unit 1422 detects the presence of the charging device 402 when the charging device 402 is first engaged with, or connected to the electronic device 404. An example detection unit 1422 includes, but is not limited to, a switch, a magnetic element operably connected to a Hall Effect sensor, a light sensor, and an image sensor. The processing device 1418 is adapted to detect the charging device 402 by monitoring, receiving, and/or analyzing the state, an output signal, or data produced by the detection unit 1422. The processing device 1418 is further adapted to determine whether the battery 1406 is receiving power from the external charging device 402.

Additionally, in the illustrated embodiment the inductive energy transfer receiver 1404 can function as a detection unit by transferring a ping to the inductive power transfer transmitter 1402 in the charging device 402 receiving or not receiving a reply ping from the inductive power transfer transmitter 1402. If the charging device 402 transmits a reply ping, or alternatively begins transmitting power, the electronic device 404 can detect the presence of the charging device 402 and the powered state of the charging device 402. However, if the charging device 402 does not transmit a reply ping, or does not begin transmitting power, the electronic device 404 can either detect the absence of the charging device 402 or the unpowered state of the charging device 402.

The electronic device 404 may also be operatively connected to an alert device 1326. The electronic device 504 can communicate with the alert device 1326 using the network/communication interface 1420. The alert device 1326 can be configured similar to the alert device 1326 shown in FIG. 13, and as such is not described in more detail herein.

It should be noted that FIGS. 13 and 14 are exemplary only. In other examples, the electronic device, charging device, and/or alert device may include fewer or more components than those shown in FIGS. 13 and 14. Additionally or alternatively, an electronic device can be included in a system and one or more components shown in FIG. 13 or in FIG. 14 is separate from the electronic device but in communication with the electronic device. For example, an electronic device may be operatively connected to, or in communication with a separate display. As another example, one or more applications or data can be stored in a memory separate from the electronic device. In some embodiments, the separate memory can be in a cloud-based system.

In accordance with some embodiments, FIGS. 13 and 14 depict functional block diagrams of an electronic device 1300, 404, a charging device 1320, 402, and an alert device 1326 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIGS. 13 and 14 are, optionally, combined or separated into sub-blocks to implement the principles of the various described embodiments. Therefore, the description herein optionally supports any possible combination or separation or further definition of the functional blocks described herein.

Additionally, as used herein, the terms "alert unit", "detection unit", "and triggering element" can be implemented by hardware, software, firmware, or a combination thereof to carry out the operations of the respective unit or element.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. An electronic device, comprising:
   an optical emitter configured to emit an optical signal toward a wireless charging device;
   an optical detector configured to detect the wireless charging device by detecting the optical signal in response to the optical signal propagating through a portion of the wireless charging device;
   a processing device operably connected to the optical detector and configured to:
      detect an initial engagement with the wireless charging device as a result of the optical detector detecting the wireless charging device; and
      in response to the detected initial engagement with the wireless charging device, determine that the wireless charging device is not supplying power to the electronic device; and
   an alert unit operably connected to the processing device and configured to produce an alert in response to receiving, from the processing device, an alert signal indicating that the wireless charging device is not supplying power to the electronic device.

2. The electronic device of claim 1, wherein:
   emitting the optical signal toward the wireless charging device causes the optical signal to:
      propagate through the portion of the wireless charging device; and
      return to the electronic device; and
   the optical detector is configured to detect the returned optical signal.

3. The electronic device of claim 1, wherein detecting the wireless charging device comprises detecting at least one of a texture, a reflective characteristic, or an absorptive characteristic of a triggering element of the wireless charging device.

4. The electronic device of claim 1, wherein:
   the optical detector comprises at least one of an image sensor or a light sensor; and
   the optical emitter comprises a light source.

5. The electronic device of claim 1, wherein the optical detector detecting the wireless charging device comprises detecting the wireless charging device in contact with the electronic device.

6. The electronic device of claim 1, wherein detecting the wireless charging device comprises detecting the optical signal in response to the optical signal propagating through a light pipe of the wireless charging device.

7. A method for operating an electronic device, comprising:
   emitting, by an optical emitter of the electronic device, an optical signal toward a wireless charging device;
   detecting an initial engagement with the wireless charging device as a result of an optical detector of the electronic device detecting the optical signal in response to the optical signal propagating through a portion of the wireless charging device;
   in response to detecting the initial engagement with the wireless charging device, determining that the wireless charging device is not supplying power to the electronic device; and
   producing an alert in response to determining that the wireless charging device is not supplying power to the electronic device.

8. The method of claim 7, wherein producing the alert comprises:
   transmitting, by a processing device of the electronic device, an alert signal indicating that the wireless charging device is not supplying power to the electronic device; and
   receiving, by an alert unit of the electronic device, the alert signal.

9. The method of claim 7, wherein detecting the initial engagement with the wireless charging device comprises detecting the wireless charging device in contact with the electronic device.

10. The method of claim 7, wherein emitting the optical signal occurs in response to detecting a surface in contact with the electronic device.

11. An electronic device, comprising:
    an optical detector configured to detect a wireless charging device by detecting an optical signal in response to the optical signal propagating through a portion of the wireless charging device; and
    a processing device operably connected to the optical detector and configured to:
       detect, with the optical detector, an initial engagement with the wireless charging device;
       determine, in response to detecting the initial engagement, whether the wireless charging device is unpowered; and
       generate an alert in response to determining that the wireless charging device is unpowered.

12. The electronic device of claim 11, further comprising an optical emitter configured to emit the optical signal toward the wireless charging device.

13. The electronic device of claim 12, wherein:
    emitting the optical signal toward the wireless charging device causes the optical signal to:
       propagate through the portion of the wireless charging device; and
       return to the electronic device.

14. The electronic device of claim 11, wherein detecting the wireless charging device comprises detecting the optical signal in response to the optical signal propagating through a light pipe of the wireless charging device.

15. The electronic device of claim 11, wherein:
    the electronic device further comprises an enclosure that defines a first surface of the electronic device; and the optical detector detects when a second surface of the wireless charging device is in contact with the first surface of the electronic device.

16. The electronic device of claim 11, wherein detecting the wireless charging device comprises detecting at least one of a texture, a reflective characteristic, or an absorptive characteristic of the wireless charging device.

17. The electronic device of claim 11, wherein the wireless charging device defines a flat surface configured to interface with a surface of the electronic device.

18. The electronic device of claim 17, wherein the optical detector detecting the wireless charging device comprises detecting the flat surface in contact with the electronic device.

19. The electronic device of claim 11, comprising an inductive power transfer receiver configured to receive energy from the wireless charging device and to charge a battery within the electronic device.

20. The electronic device of claim 11, wherein the electronic device is a watch.

* * * * *